United States Patent
Reid et al.

(10) Patent No.: US 12,157,669 B2
(45) Date of Patent: *Dec. 3, 2024

(54) METHODS OF PRODUCING HYDROGEN AND NITROGEN USING A FEEDSTOCK GAS REACTOR

(71) Applicant: Ekona Power Inc., Burnaby (CA)

(72) Inventors: Christopher Edwin John Reid, Vancouver (CA); Gary Edward Schubak, Vancouver (CA); Kenneth William Kratschmar, Vancouver (CA); David Aaron Leboe, Vancouver (CA); Shawn Dayupay Esquivel, Vancouver (CA); Guowei Li, Vancouver (CA)

(73) Assignee: EKONA POWER INC., Burnaby (CA)

( * ) Notice: Subject to any disclaimer, the term of this patent is extended or adjusted under 35 U.S.C. 154(b) by 738 days.

This patent is subject to a terminal disclaimer.

(21) Appl. No.: 17/384,405

(22) Filed: Jul. 23, 2021

(65) Prior Publication Data
US 2022/0185663 A1   Jun. 16, 2022

Related U.S. Application Data

(60) Provisional application No. 63/125,785, filed on Dec. 15, 2020.

(51) Int. Cl.
*C01B 3/24* (2006.01)
*C01B 3/02* (2006.01)
(Continued)

(52) U.S. Cl.
CPC ............... *C01B 3/24* (2013.01); *C01B 3/025* (2013.01); *C01B 3/505* (2013.01); *C01B 3/508* (2013.01);
(Continued)

(58) Field of Classification Search
CPC ........... C01B 3/24; C01B 3/025; C01B 3/505; C01B 3/508; C01B 32/05;
(Continued)

(56) References Cited

U.S. PATENT DOCUMENTS 4,123,220 A * 10/1978 Bond ............... C01B 3/363
422/165
4,846,851 A   7/1989 Guro et al.
(Continued)

FOREIGN PATENT DOCUMENTS

CA   2379892 A1   2/2001
CA   2880075 A1   2/2014
(Continued)

OTHER PUBLICATIONS

Kinetic model of homogeneous thermal decomposition of methane and ethane, Maryam Younessi-Sinaki, Edgar A. Matida, Feridun Hamdullahpur, Carleton University, Department of Mechanical and Aerospace Engineering, 1125 Colonel by Drive, Ottawa, ON K1S 5B6, Canada. 2009.
(Continued)

*Primary Examiner* — Andrew J. Oyer
(74) *Attorney, Agent, or Firm* — D'Ambrosio & Menon, PLLC; Usha Menon

(57) ABSTRACT

There is described a method of producing hydrogen and nitrogen using a feedstock gas reactor. Reaction of feedstock and combustion gases in the reactor produces hydrogen and nitrogen through pyrolysis of the feedstock gas. Parameters of the process may be adjusted to control the ratio of hydrogen to nitrogen that is produced such that it may be suitable, for example, for the synthesis of ammonia.

31 Claims, 14 Drawing Sheets

(51) Int. Cl.
*C01B 3/50* (2006.01)
*C01B 32/05* (2017.01)

(52) U.S. Cl.
CPC ...... *C01B 32/05* (2017.08); *C01B 2203/0272* (2013.01); *C01B 2203/0405* (2013.01); *C01B 2203/043* (2013.01); *C01B 2203/047* (2013.01); *C01B 2203/0475* (2013.01); *C01B 2203/048* (2013.01); *C01B 2203/0827* (2013.01); *C01B 2203/1241* (2013.01); *C01B 2203/148* (2013.01); *C01B 2203/1623* (2013.01); *C01B 2203/1638* (2013.01); *C01B 2203/1657* (2013.01); *C01B 2203/168* (2013.01)

(58) Field of Classification Search
CPC .... C01B 2203/0272; C01B 2203/0405; C01B 2203/043; C01B 2203/047; C01B 2203/0475; C01B 2203/048; C01B 2203/0827; C01B 2203/1241; C01B 2203/148; C01B 2203/1623; C01B 2203/1638; C01B 2203/1657; C01B 2203/168; C01B 2203/068; C01B 2203/0811; C01B 2203/82; C01B 21/00; C01B 3/34; C01B 3/50; C01B 2203/1676; C01B 2203/169; B01J 2219/00247; B01J 6/008; B01J 12/005; B01J 19/0026; B01J 19/241; B01J 19/242; B01J 19/244; B01J 19/2475; B01J 19/248; B01J 19/28

See application file for complete search history.

(56) References Cited

U.S. PATENT DOCUMENTS

| | | | |
|---|---|---|---|
| 5,300,216 A | 4/1994 | Hertzberg et al. | |
| 5,864,517 A | 1/1999 | Hinkey et al. | |
| 6,986,870 B1 | 1/2006 | Brandenburg | |
| 7,537,623 B2 | 5/2009 | Etievant et al. | |
| 8,721,980 B2 | 5/2014 | Peters | |
| 9,084,978 B2 | 7/2015 | Peters | |
| 9,187,335 B2 | 11/2015 | Peters | |
| 9,359,218 B2 | 6/2016 | Peters | |
| 9,737,865 B2 | 8/2017 | Peters | |
| 10,464,818 B2 | 11/2019 | Filippi et al. | |
| 2005/0072152 A1 | 4/2005 | Suzuki et al. | |
| 2008/0118413 A1 | 5/2008 | Lomax et al. | |
| 2011/0283705 A1 | 11/2011 | Oliver | |
| 2018/0215615 A1 | 8/2018 | Kielb | |
| 2019/0023565 A1 | 1/2019 | Filippi et al. | |

FOREIGN PATENT DOCUMENTS

| | | |
|---|---|---|
| CA | 3115358 A1 | 6/2020 |
| CA | 3115360 A1 | 6/2020 |
| CN | 1245480 A | 2/2000 |
| CN | 1339014 A | 3/2002 |
| CN | 104540583 A | 4/2015 |
| EP | 1078020 B1 | 11/2003 |
| GB | 1467123 A | 3/1977 |
| JP | 3844226 A | 2/2004 |
| WO | 1999058614 | 11/1999 |
| WO | 2002062700 A3 | 8/2002 |
| WO | 2006108124 | 10/2006 |
| WO | 2011022761 A1 | 3/2011 |
| WO | 2020118417 A1 | 6/2020 |

OTHER PUBLICATIONS

Wave rotor design method with three steps including experimental validation, Chan Shining et al. Journal of Engineering for Gas Turbines and Power, Dec. 2017.

Zhang, C., Current status of stationary fuel cells for coal power generation, Clean Energy, Jul. 2018, vol. 2, pp. 126-139.

* cited by examiner

METHODS OF PRODUCING HYDROGEN AND NITROGEN USING A FEEDSTOCK GAS REACTOR

CROSS REFERENCE TO RELATED APPLICATION(S)

This application is related to and claims priority to U.S. Provisional Patent Application No. 63/125,785 filed on Dec. 15, 2020, the contents of which are incorporated by reference herein.

FIELD

The present disclosure relates to methods of producing hydrogen and nitrogen using a feedstock gas reactor. For example, using the feedstock gas reactor, hydrogen and nitrogen may be produced for ammonia synthesis.

BACKGROUND

Many industries rely on the use of industrial hydrogen gas ($H_2$), including petroleum production, ammonia production, methanol production, and others. Approximately 96% of industrial hydrogen is derived from fossil fuels with the majority being produced by steam methane reforming (SMR) of natural gas. Such incumbent processes are also responsible for significant greenhouse gas emissions. SMRs, for example, can produce between 10-17 tonnes of carbon dioxide ($CO_2$) per tonne of hydrogen produced. Adding $CO_2$ cleanup and sequestration to SMR flue gas streams is generally cost-prohibitive unless penalties for carbon dioxide emissions increase substantially.

In particular, ammonia production is a major source of global carbon dioxide ($CO_2$) greenhouse gas emissions, and accounts for approximately 1% of global $CO_2$ emissions. Alone, the production of hydrogen feedstock used for ammonia synthesis accounts for approximately 50% of the total $CO_2$ emitted from the ammonia production process, while the balance of emissions is associated with the energy demand required for the Haber-Bosch process of ammonia synthesis from $H_2$ and $N_2$ feedstocks.

The incumbent method of hydrogen production for ammonia synthesis involves steam reforming of natural gas (steam methane reforming: SMR). SMR generates a hydrogen-rich synthesized gas (or "syngas") which is purified to produce hydrogen for use in ammonia production. SMR has the drawback that it also creates a $CO_2$-intensive flue gas stream which is typically exhausted to the atmosphere. The flue gas has a typical carbon intensity in the range of 10 to 17 kg $CO_2$e/kg$H_2$. Although $CO_2$ emissions can be separated from the flue gas and sequestered to reduce the environmental impact of the process, this added process step incurs a significant cost which can impact the overall economic viability of a low carbon intensity process for ammonia synthesis syngas production.

Nitrogen for ammonia synthesis is conventionally produced either by an air separation unit (ASU) or by an air-fed secondary partial oxidation (POX) stage of the reforming process. The secondary reformer further reacts the synthesis gas from the primary reformer and supplies sufficient air for ammonia production after residual carbon oxides are removed. An ASU solution is conventionally a large-scale cryogenic separator which separates air into its molecular components of oxygen and nitrogen. ASU operation is energy-intensive and the equipment itself comes at a significant capital expense.

Two-stage reforming is the most common method of ammonia synthesis gas production and is well known in the prior art. Many process improvements have been made to increase reforming process efficiency for ammonia feedstock production, such as those described in US Patent Application Publication No. 2019/0023565. Further prior art has proposed improved methods for ammonia synthesis, such as described in U.S. Pat. Nos. 4,846,851 and 10,464,818. While each of these process improvements can incrementally improve the overall process efficiency, they remain incremental improvements and as such incremental improvements in emission reduction.

Alternative means of sustainable hydrogen production include the production of hydrogen from renewable electricity using an electrolyzer, or decomposing natural gas into pure hydrogen and solid sequesterable carbon using thermal pyrolysis where the heat of reaction is supplied by a source of renewable electricity. While such systems can yield a sustainable low-carbon emission source of hydrogen, the technologies are not cost-competitive with incumbent methods and are not widely adopted.

SUMMARY

According to a first aspect of the disclosure, there is provided a method of producing hydrogen and nitrogen using a feedstock gas reactor comprising a reaction chamber fluidly connected to a combustion chamber via one or more fluid flow paths, the method comprising: introducing a feedstock gas comprising a hydrocarbon into the reaction chamber; introducing a combustible gas mixture into the combustion chamber, wherein the combustible gas mixture comprises air and one or more combustible gases; combusting the combustible gas mixture in the combustion chamber so as to form one or more combustion product gases comprising nitrogen and so as to cause at least a portion of the one or more combustion product gases to flow into the reaction chamber via the one or more fluid flow paths and mix with the feedstock gas, wherein, as a result of the mixing of the at least a portion of the one or more combustion product gases with the feedstock gas, energy is transferred from the at least a portion of the one or more combustion product gases to the feedstock gas and thereby causes a chemical reaction to decompose the feedstock gas into one or more reaction product gases comprising hydrogen; extracting a mixed product stream from the feedstock gas reactor, wherein the mixed product stream comprises hydrogen from the one or more reaction product gases and nitrogen from the one or more combustion product gases; collecting hydrogen and nitrogen from the mixed product stream; and adjusting one or more parameters of the method such that the collection of the hydrogen and the nitrogen is performed according to a desired ratio.

The desired ratio of hydrogen to nitrogen may be between about 1:1 and about 5:1.

The desired ratio of hydrogen to nitrogen may be about 3:1.

The one or more parameters may comprise one or more of: a pressure of the feedstock gas at an inlet of the reaction chamber; a temperature of the feedstock gas at the inlet of the reaction chamber; a pressure of the combustible gas mixture at an inlet of the combustion chamber; a temperature of the combustible gas mixture at the inlet of the combustion chamber; a stoichiometry of the air in the combustible gas mixture; a quantity of gas vented from the combustion chamber; and a degree of hydrogen separation of a hydrogen separator through which the mixed product stream is passed.

Extracting the mixed product stream may comprise extracting from the reaction chamber a reaction product gas stream comprising at least a portion of the one or more reaction product gases.

Extracting the mixed product stream may comprise extracting from the combustion chamber a combustion product gas stream comprising at least a portion of the one or more combustion product gases.

The method may further comprise venting at least a portion of the combustion product gas stream.

Adjusting the one or more parameters may comprise adjusting a vent gas quantity of the combustion product gas stream, wherein the vent gas quantity is indicative of a relative quantity of the combustion product gas stream that is vented.

Adjusting the vent gas quantity may comprise adjusting one or more of: a duration of the venting of the at least a portion of the combustion product gas stream; a frequency of the venting of the at least a portion of the combustion product gas stream; a size of one or more vent orifices used for the venting of the at least a portion of the combustion product gas stream; a number of vents used for the venting of the at least a portion of the combustion product gas stream; and a pressure drop across a vent flow path used for the venting of the at least a portion of the combustion product gas stream.

The vent gas quantity may be from about 10% to about 100% of a quantity of the one or more combustion product gases formed in the combustion chamber.

The vent gas quantity may be about 80% of the quantity of the one or more combustion product gases formed in the combustion chamber.

Adjusting the vent gas quantity may be based on a measured or inferred process parameter of the method.

The measured or inferred process parameter may comprise one or more of: a concentration of $H_2$ in the mixed product stream; a flow rate of the feedstock gas; and a ratio of $H_2$ to $N_2$ in the mixed product stream.

The steps of introducing the feedstock gas, introducing the combustible gas mixture, and combusting the combustible gas mixture may be repeated multiple times as part of multiple corresponding reaction cycles, and the step of venting the at least a portion of the combustion product gas stream may be performed every reaction cycle or every preset number of reaction cycles.

Adjusting the one or more parameters of the method may comprise controlling a stoichiometry of the air in the combustible gas mixture to within a range of about 0.6 to about 1.4, or about 1.1 to about 1.4.

Controlling the stoichiometry of the air in the combustible gas mixture may comprise controlling the stoichiometry of the air in the combustible gas mixture to about 1.2.

Controlling the stoichiometry of the air in the combustible gas mixture may comprise adjusting one or more of: a pressure of the one or more combustible gases at a first inlet of the combustion chamber; and a pressure of the air at a second inlet of the combustion chamber. The first and second inlets may be the same or different inlets.

Adjusting the one or more parameters of the method may comprise controlling a pressure or a temperature of the combustible gas mixture at an inlet of the combustion chamber by controlling one or more of: a compressor for recirculating a tail gas extracted from the feedstock reactor; and an air feed compressor for delivering an oxidant to the feedstock reactor.

Adjusting the one or more parameters of the method may comprise controlling a pressure or a temperature of the feedstock gas at an inlet of the reaction chamber by controlling an output of one or more of: a compressor for recirculating a tail gas extracted from the feedstock reactor; and an air feed compressor for delivering the feedstock gas to the feedstock reactor.

Collecting the hydrogen and the nitrogen from the mixed product stream may comprise separating at least some hydrogen from the mixed product stream.

Separating the at least some hydrogen may comprise using one or more of: a membrane separator; chemical adsorption; pressure swing adsorption; and temperature swing adsorption.

The membrane separator may be a polymeric membrane separator or a palladium membrane separator.

The method may further comprise recirculating to the feedstock reactor hydrogen that is not separated from the mixed product stream.

The combustible gas mixture may be introduced into the combustion chamber at a pressure that is equal to a pressure with which the feedstock gas is introduced into the reaction chamber.

Introducing the combustible gas mixture into the combustion chamber may comprise controlling a quantity of the combustible gas mixture that is introduced into the combustion chamber by controlling one or more of a pressure and a temperature of the combustible gas mixture.

The method may further comprise, during the introduction of the combustible gas mixture into the combustion chamber, controlling a temperature of the combustible gas mixture to between about 300 K and about 600 K.

The method may further comprise, during the introduction of the feedstock gas into the reaction chamber, controlling a temperature of the feedstock gas to between about 1,000 K and about 1,300 K.

The method may further comprise, during the introduction of the combustible gas mixture into the combustion chamber, controlling a pressure of the combustible gas mixture to between about 1 bar and about 20 bar.

Controlling the pressure of the combustible gas mixture may comprise controlling the pressure of the combustible gas mixture to between about 12 bar and about 14 bar.

The method may further comprise preheating the feedstock gas prior to introducing the feedstock gas into the reaction chamber.

The method may further comprise preheating the combustible gas mixture prior to introducing the combustible gas mixture into the combustion chamber.

A ratio of a volume of the reaction chamber to a volume of the combustion chamber may be less than or equal to about 10:1.

The ratio of the volume of the reaction chamber to the volume of the combustion chamber may be between about 3:1 and about 6:1.

A ratio of a length of the reaction chamber to a diameter of the reaction chamber may be less than or equal to about 30:1.

The ratio of the length of the reaction chamber to the diameter of the reaction chamber may be between about 8:1 and about 12:1.

The feedstock gas may comprise a mixture of natural gas and recycled gas comprising one or more gases extracted from the mixed product stream.

The recycled gas may comprise one or more of: recycled unreacted feedstock gas; hydrogen; carbon monoxide; carbon dioxide; and nitrogen.

Introducing the combustible gas mixture into the combustion chamber may occur simultaneously to introducing the feedstock gas into the reaction chamber.

During the extraction of the mixed product stream, a pressure within the reaction chamber may be reduced sufficiently rapidly so as to inhibit carbon fouling of the reaction chamber.

The pressure within the reaction chamber may be reduced by at least 25% over less than 1 second.

A pressure wave generated by the combustion of the combustible gas mixture may inhibit carbon fouling of the reaction chamber.

The energy may be transferred from the at least a portion of the one or more combustion product gases to the feedstock gas via gas dynamic compression and mixing.

According to a further aspect of the disclosure, there is provided a system comprising: a feedstock gas reactor comprising: a reaction chamber; a combustion chamber fluidly connected to the reaction chamber via one or more fluid flow paths; and an igniter; valving for controlling flow of gases into and out of the feedstock gas reactor; and one or more controllers configured to perform a method comprising: controlling the valving to introduce a feedstock gas comprising a hydrocarbon into the reaction chamber; controlling the valving to introduce a combustible gas mixture into the combustion chamber, wherein the combustible gas mixture comprises air and one or more combustible gases; controlling the igniter to combust the combustible gas mixture in the combustion chamber so as to form one or more combustion product gases comprising nitrogen and so as to cause at least a portion of the one or more combustion product gases to flow into the reaction chamber via the one or more fluid flow paths and mix with the feedstock gas, wherein, as a result of the mixing of the at least a portion of the one or more combustion product gases with the feedstock gas, energy is transferred from the at least a portion of the one or more combustion product gases to the feedstock gas and thereby causes a chemical reaction to decompose the feedstock gas into one or more reaction product gases comprising hydrogen; controlling the valving to extract a mixed product stream from the feedstock reactor, wherein the mixed product stream comprises hydrogen and nitrogen; collecting hydrogen and nitrogen from the mixed product stream; and adjusting one or more parameters of the method such that the collection of the hydrogen and the nitrogen is performed according to a desired ratio.

The desired ratio of hydrogen to nitrogen may be between about 1:1 and about 5:1.

The desired ratio of hydrogen to nitrogen may be about 3:1.

The combustion chamber may be located within the reaction chamber.

The combustion chamber may be offset from a longitudinal axis of the reaction chamber.

The combustion chamber may be located outside the reaction chamber.

The combustion chamber may comprise one or more apertures formed therein.

The valving may comprise valves connected to a common drive shaft.

The valving may comprise poppet valves sequenced by a cam shaft.

The system may further comprise a carbon separator for separating carbon from the mixed product stream.

The carbon separator may comprise one or more of: a cyclone; a sintered metal filter; and a bag filter.

The system may further comprise a hydrogen separator for separating hydrogen from the mixed product stream.

The hydrogen separator may be configured to allow nitrogen to pass therethrough.

The hydrogen separator may comprise one or more of: a membrane separator; a chemical adsorption device; a pressure swing adsorption device; and a temperature swing adsorption device.

The membrane separator may be a polymeric membrane separator or a palladium membrane separator.

The system may further comprise one or more vents located according to one or more of the following: in the combustion chamber; downstream of the feedstock reactor; downstream of a carbon separator; and in a recirculation line for recycling a syngas stream formed as a result of separating carbon and hydrogen from the mixed product stream.

The one or more controllers may be further configured to adjust one or more of: a duration that the one or more vents are open; a frequency of opening of the one or more vents; and a size of one or more orifices of the one or more vents.

This summary does not necessarily describe the entire scope of all aspects. Other aspects, features, and advantages will be apparent to those of ordinary skill in the art upon review of the following description of specific embodiments.

BRIEF DESCRIPTION OF THE DRAWINGS

The accompanying drawings illustrate non-limiting example embodiments of the disclosure. The drawings are schematic or simplified representations intended only to clearly illustrate various aspects of the disclosure.

DETAILED DESCRIPTION

The present disclosure seeks to provide methods of producing hydrogen and nitrogen using a feedstock gas reactor. While various embodiments of the disclosure are described below, the disclosure is not limited to these embodiments, and variations of these embodiments may well fall within the scope of the disclosure which is to be limited only by the appended claims.

Embodiments of the present disclosure relate, using methods of methane pyrolysis, to the production of ammonia synthesis feedstock syngas with appropriate proportions of feedstock constituents, such as hydrogen ($H_2$) and nitrogen ($N_2$). Embodiments of the disclosure may reduce greenhouse gas emissions compared to prior art methods of ammonia synthesis in which hydrogen is derived from a natural gas feedstock.

Based on the present state of the art, relatively low carbon intensity ammonia production using conventional processes is generally not economically viable. An alternative process for low carbon intensity hydrogen production is therefore proposed by way of the present disclosure. According to embodiments of the disclosure, methods described herein use pulsed combustion to supply the heat required for thermal pyrolysis, or hydrocarbon dissociation. This pulsed methane pyrolyzer (PMP) process is described in co-pending PCT Publication No. WO 2020/118417 A1, hereby incorporated by reference in its entirety. The PMP process represents a viable alternative to conventional SMR-based methods for large-scale hydrogen production, is more cost-competitive, and can reduce relative carbon emissions by over 90%.

According to embodiments of the disclosure, the PMP may be supplied with air as an oxidant feedstock, and one or more parameters of the process may be tailored to yield a mixed hydrogen and nitrogen product stream with a desired ratio of hydrogen to nitrogen. For example, according to some embodiments, hydrogen and nitrogen may be produced in a ratio of about 3:1 $H_2$:$N_2$ which is suitable as a feedstock for ammonia synthesis.

With reference to FIGS. 4A-14, there will now be described embodiments a PMP pyrolyzer or reactor that may be used with any of the methods described herein. The pyrolyzer may operate according to an unsteady, constant-volume pulsed reaction process to produce hydrogen and carbon products from a natural gas-based feedstock. A separate chamber of combustible gases and an oxidant provides the energy for the reaction, and is transferred directly to the feedstock mixing chamber by gas-dynamic compression and rapid mixing thermal energy exchange via direct contact. In the discussion below, air is used as the oxidant; however, other oxidants such as pure oxygen can be used in the process. Furthermore, the feedstock gas and combustible gas can comprise the same gas or gas mixture or can comprise different gases or gas mixtures. In some embodiments, the combustible gas may comprise a recycled gas mixture.

Figure 4A:
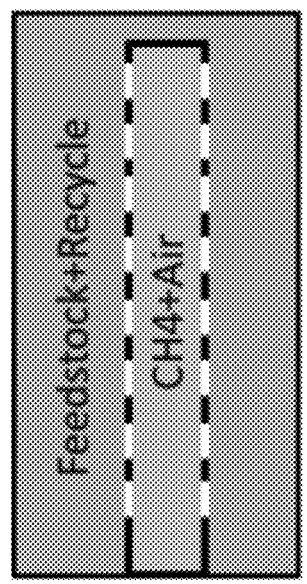
FIGS. 4A and 4B show different arrangements of a mixing chamber and a combustion chamber, according to an embodiment of the disclosure.
Figure 4B:
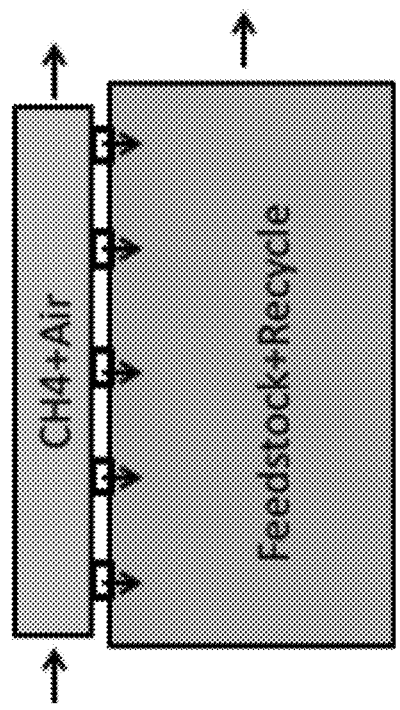

The reactor comprises a mixing chamber and a combustion chamber. These chambers are connected via a number of passageways that are always open. In some embodiments, the reactor comprises a perforated tube (the combustion chamber) within a larger solid tube (the mixing chamber); see FIG. 4A. In other embodiments, the combustion chamber can be external to the mixing chamber (as shown in FIG. 4B). External valves provide the feedstock, oxidant and combustible gas (shown as $CH_4$) as well as the discharged hydrogen, carbon and other gases produced during the reaction.

Figure 5:
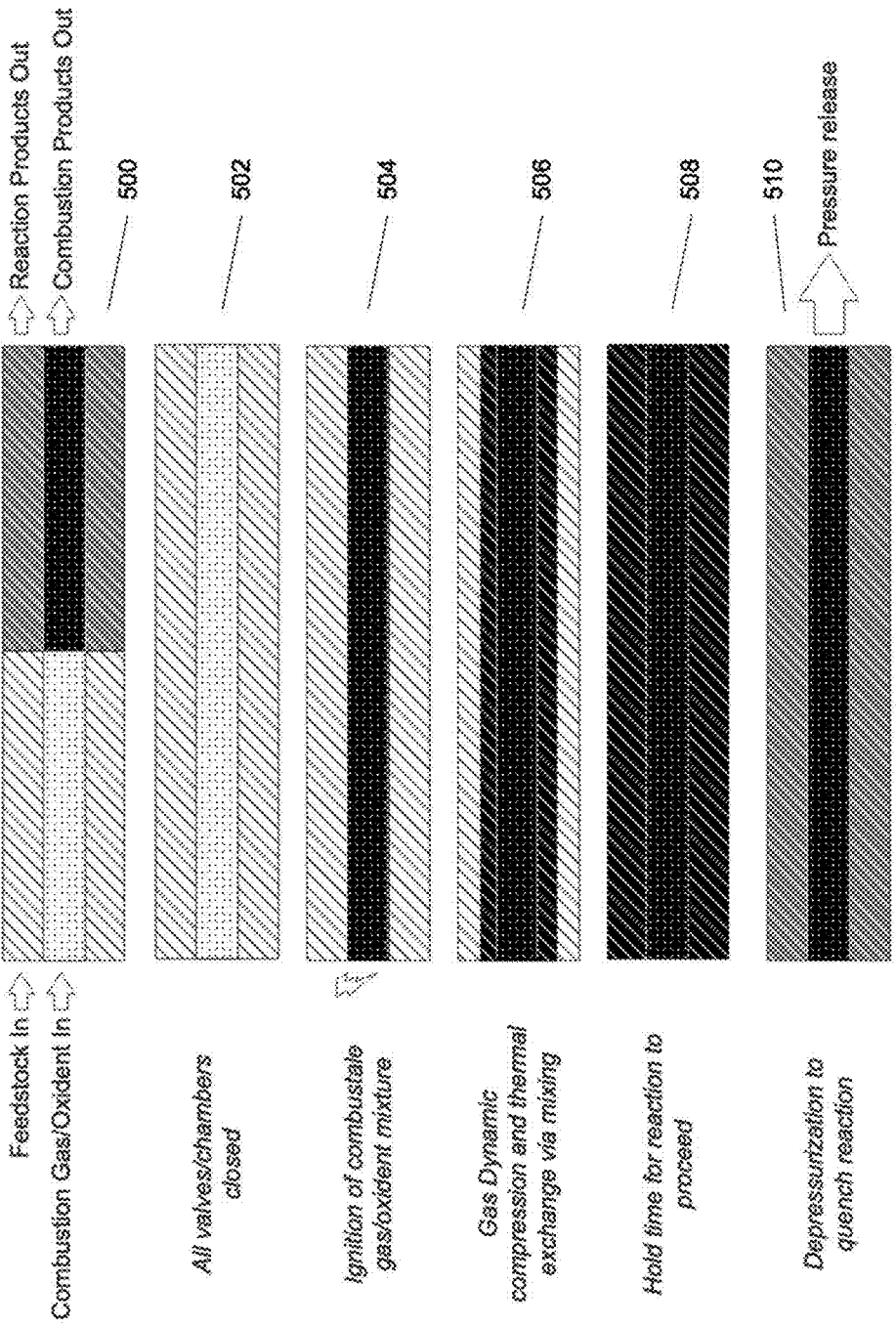
FIG. 5 is a schematic diagram of a method of cracking natural gas, according to an embodiment of the disclosure.

Turning to FIG. 5, at the start of the cycle, the mixing chamber is filled with the products of the previous reaction cycle. The mixing chamber is filled with a mixture of products of the feedstock reaction plus a portion of the products of the combustion reaction. The combustion chamber is predominantly filled with the products of the combustion reaction. At 500, fresh feedstock and perhaps some recycled product gases are introduced into the mixing chamber to displace the products of the previous cycle from the end of the mixing chamber. At the same time, a combustible gas/air mixture is introduced into the combustion chamber, displacing the products of combustion from the end of the combustion chamber. At 502, all inlet and outlet valves are closed, creating a closed volume. At 504, the gases in the combustion chamber are then ignited resulting in a pressure and temperature increase within the combustion chamber. At 506, the passageways between the combustion chamber and the mixing chamber allow the combustible gas products to enter into the mixing chamber thereby compressing the feedstock gases and increasing their pressure and temperature. In addition, the hot combustion chamber gas products mix with the feedstock gases and thereby transfer their thermal energy to the feedstock gases, further increasing their temperature. The resulting temperature and pressure of the feedstock gases causes a reaction to occur. At 508, the reaction is allowed to proceed for a period of time to complete the desired reaction and develop the desired products. At 510, the pressure within the mixing chamber is rapidly lowered by releasing the products to an external volume (not shown). Combustion product gases remaining in the combustion chamber may be vented out with the mixing chamber gases or vented out separately though a dedicated port. The pressure reduction in the mixing chamber reduces the temperature and stops or quenches the reaction. This rapid depressurization and expansion also has the desirous effect of removing solid reaction products, such as carbon, from the reactor walls. In addition, the pressure wave generated from the combustion may strip carbon deposits from the reactor walls.

If the feedstock and combustible gases are premixed, the mixture may not ignite, as it is too rich. Therefore, the mixing chamber and combustion chamber are distinct and separate prior to ignition, such that no or preferably very little mixing occurs between the feedstock gas and the combustible gas.

Figure 6:
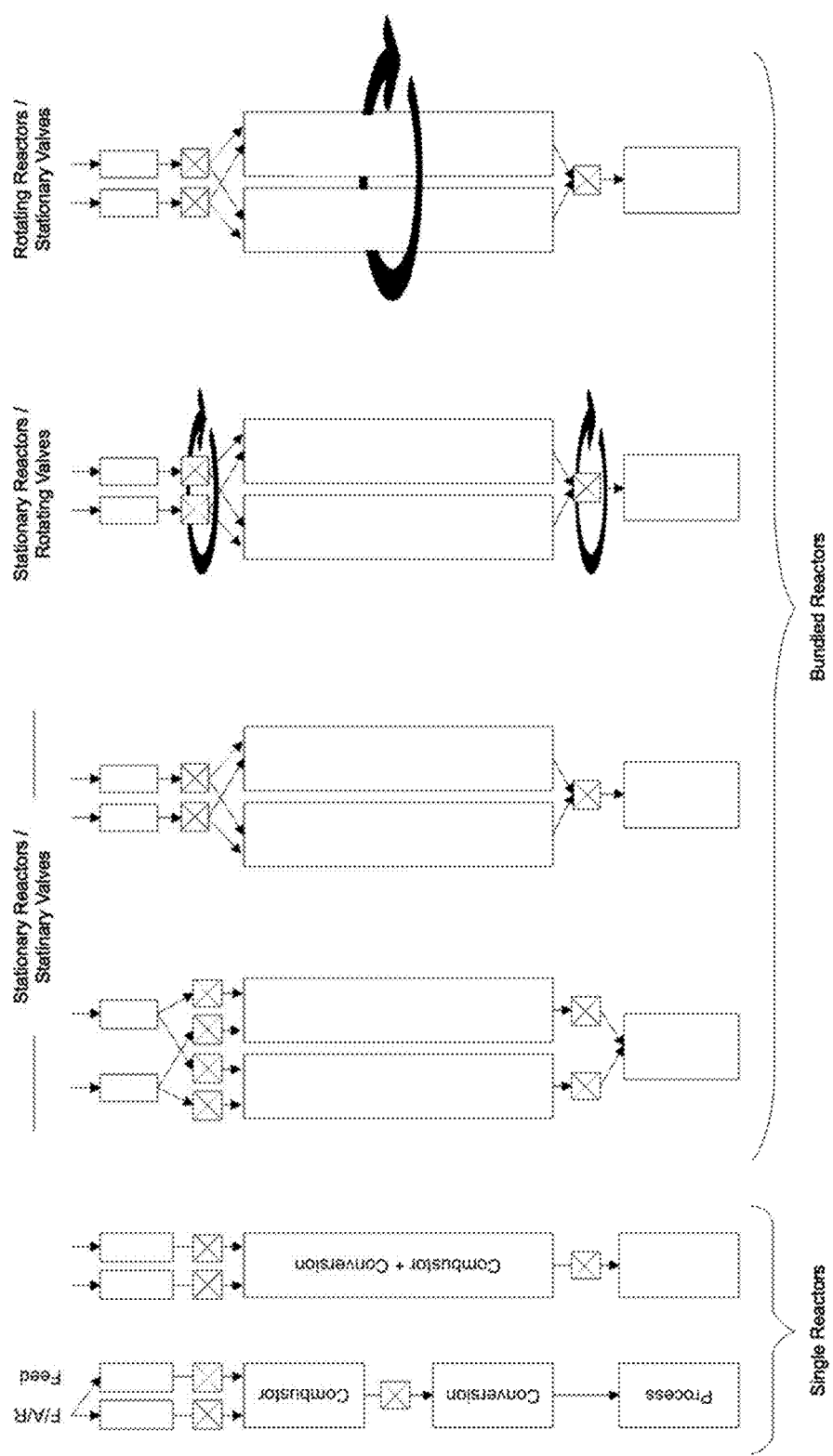
FIG. 6 shows different configurations of a system comprising bundled reactors operating out of phase, according to an embodiment of the disclosure.
Figure 7:
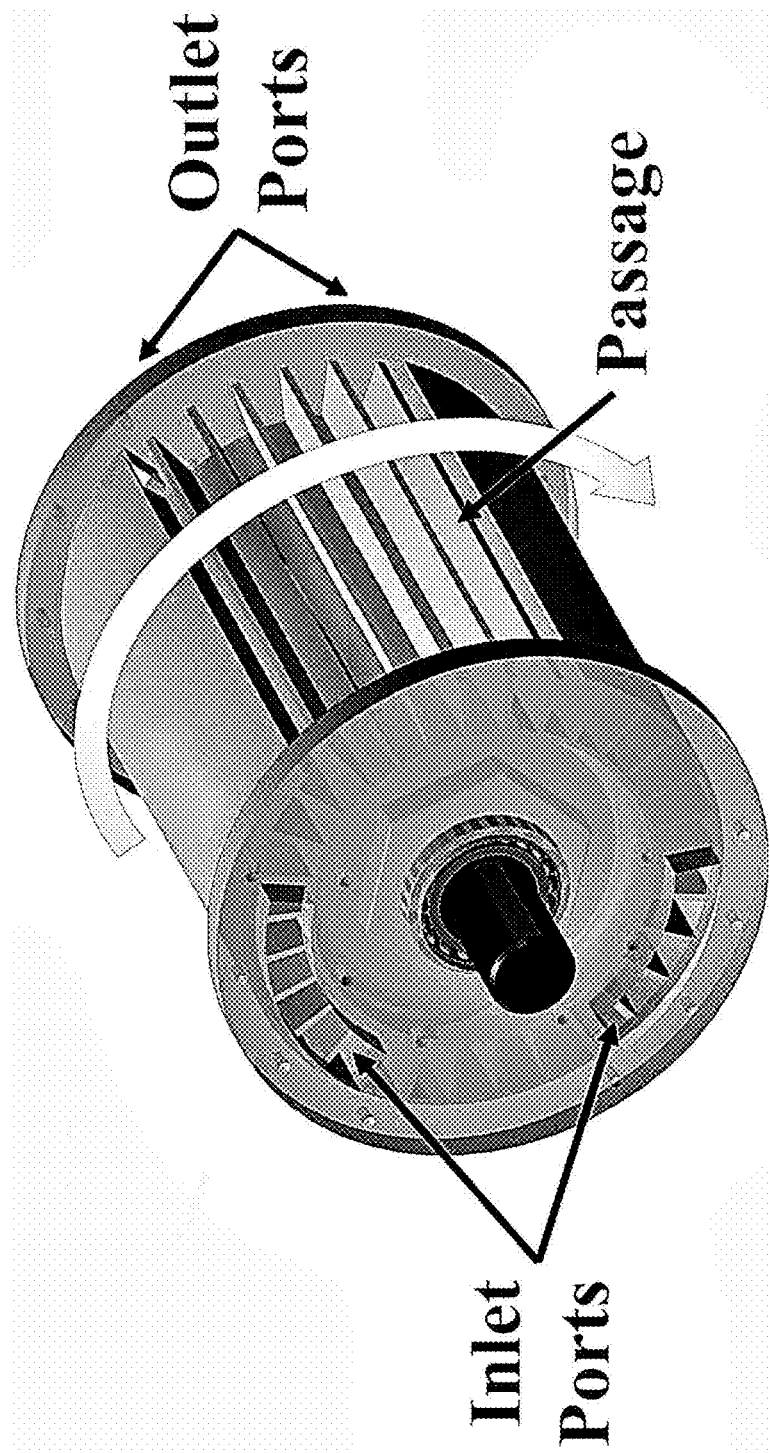
FIG. 7 shows bundled reactors rotating around stationary valves, according to an embodiment of the disclosure.

A number of reactor systems may be bundled together and operated slightly out of phase with each other to produce a continuous flow into and out of the reactor system. Valves can be stationary or rotating, as shown in FIG. 6. In some embodiment, the reactors can be rotated and the valves may remain stationary (see FIG. 7, modified from FIG. 2 of *Wave rotor design method with three steps including experimental validation*, Chan Shining et al., Journal of Engineering for Gas Turbines and Power, December 2017, the entirety of which is hereby incorporated by reference).

Various parameters may be adjusted to enable the reactor to work effectively. The feedstock gas may be preheated to just below the temperature at which it starts to react, before being introduced into the mixing chamber. A typical temperature would be in the range of 600 K-1,300 K, depending on the feedstock components and working pressures.

Furthermore, the combustible gas/oxidant mixture being introduced may also be preheated before entering the combustion chamber. A typical temperature would be in the range of 400 K-700 K depending on the combustible gases used. Preheating the combustible gas/oxidant mixture may improve the efficiency of the process such that more combustion energy is transferred to the reactants rather than being used to heat the products of combustion.

The volume ratio between the mixing chamber and combustion chamber should be set such that the correct amount of energy contained in the combustion chamber is provided to the mixing chamber to produce the desired products. There should also be sufficient combustible gas products entering the mixing chamber to provide effective mixing. A volume ratio of <10:1 is generally desired. When using air as the oxidant, nitrogen may be beneficial as a non-reactive gas that promotes a lower volume ratio and increases mixing. When using pure oxygen as the oxidant, another gas such as $CO_2$ may provide the same benefit as nitrogen in the air as oxidant case. Introducing additional $CO_2$ to the combustible gas mixture may result in greater solid carbon production.

The length-to-diameter ratio is important to obtain efficient energy transfer from the combustion chamber to the mixing chamber. Short, large-diameter reactors will tend to have poor mixing while long, skinny reactors will develop challenges in introducing the feedstock and combustible gases into the reactor along its length. A length-diameter ratio of <30:1 is generally desired.

Figure 13:
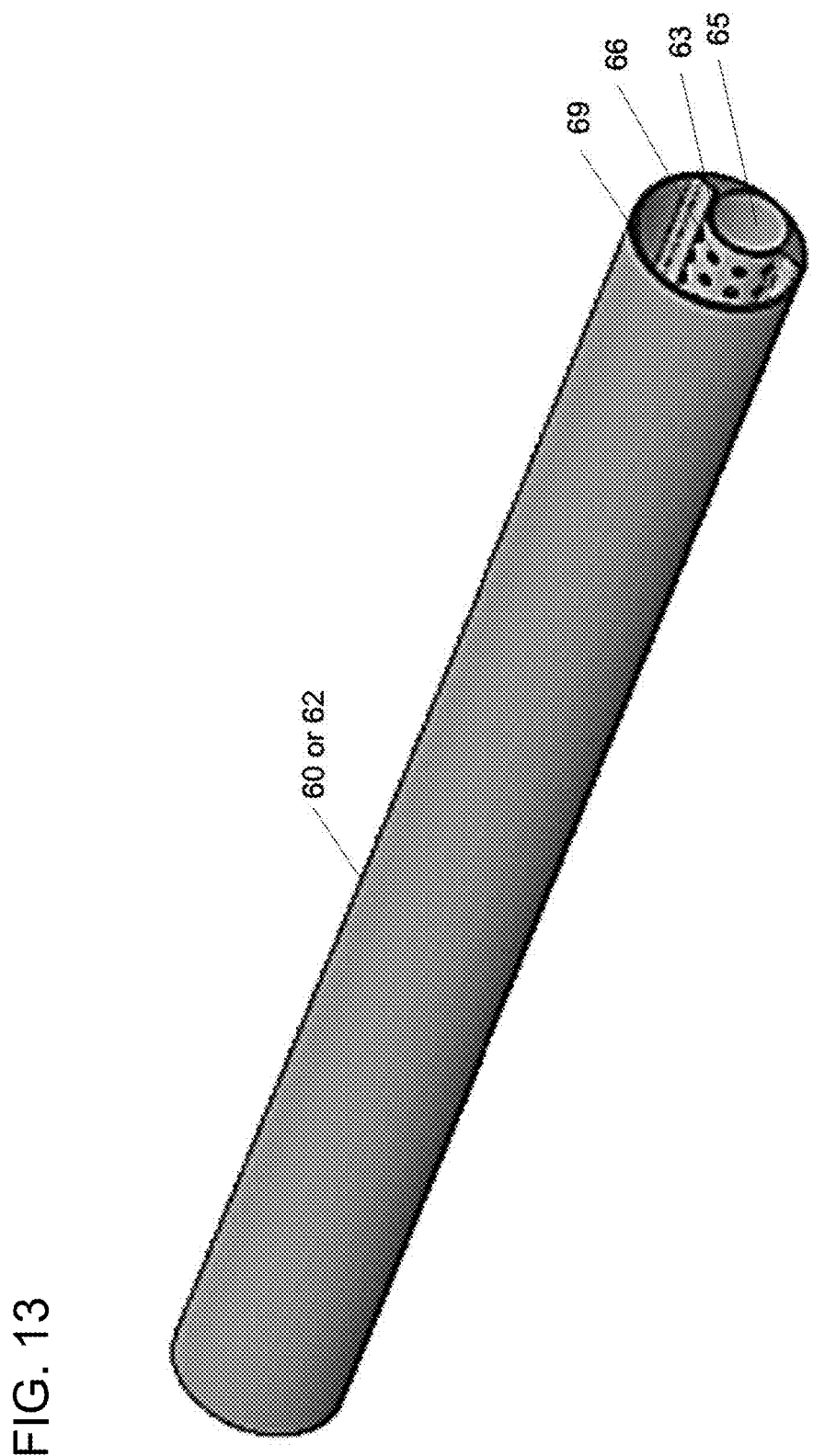
FIG. 13 shows a combustion chamber arranged within a mixing chamber, according to an embodiment of the disclosure.

According to some embodiments, the reactor uses methane (or natural gas) in addition to some recycled product gases as the feedstock gas, and a recycled gas/oxidant mixture as the combustible gases. The reactor may be designed and operated to maximize the production of hydrogen and solid carbon in the reaction products stream. The reactor may comprise a combustion chamber, being a perforated tube, inside a mixing chamber. The perforated combustion chamber may be offset from the center of the mixing chamber and bonded to a wall of the mixing chamber to provide structural integrity and support, as can be seen in FIG. 13. The mixing chamber/combustion chamber volume ratio may be less than or equal 10:1 and the length-to-diameter ratio may be 10:1. In some embodiments the mixing chamber/combustion chamber volume ratio may be about 6:1, and in some embodiments the mixing chamber/combustion chamber volume ratio may be about 3.5:1.

The reactor may be operated at a sufficiently high pressure such that the resulting hydrogen can be purified using standard pressure swing absorption technology. According to some embodiments, product gases such as unreacted methane ($CH_4$), carbon monoxide (CO) and some hydrogen are recycled and mixed with more methane to produce the feedstock gas mixture to the reactor. The combustible gas mixture comprises the recycled gas mixture in addition (in the case of an air-blown reactor) to the $CO_2$ removed from the $CO_2$ removal system, and pure oxygen. In some embodiments, the recycled gas mixture flowing to both the combustion and mixing chambers contains $CO_2$ in addition to $CH_4$, CO and $H_2$. The feedstock gas mixture and the combustible gas mixture are preheated to ~900K and ~600K respectively, from thermal energy recovered from the reactor products stream via a multi-stream heat exchanger. In alternative embodiments, the mixing chamber/combustion chamber volume ratio is 3.5:1, methane (or natural gas)/air mixture is used for the combustible gases.

With reference to FIGS. 8-14, there will now be described further embodiments of the disclosure.

Figure 8:
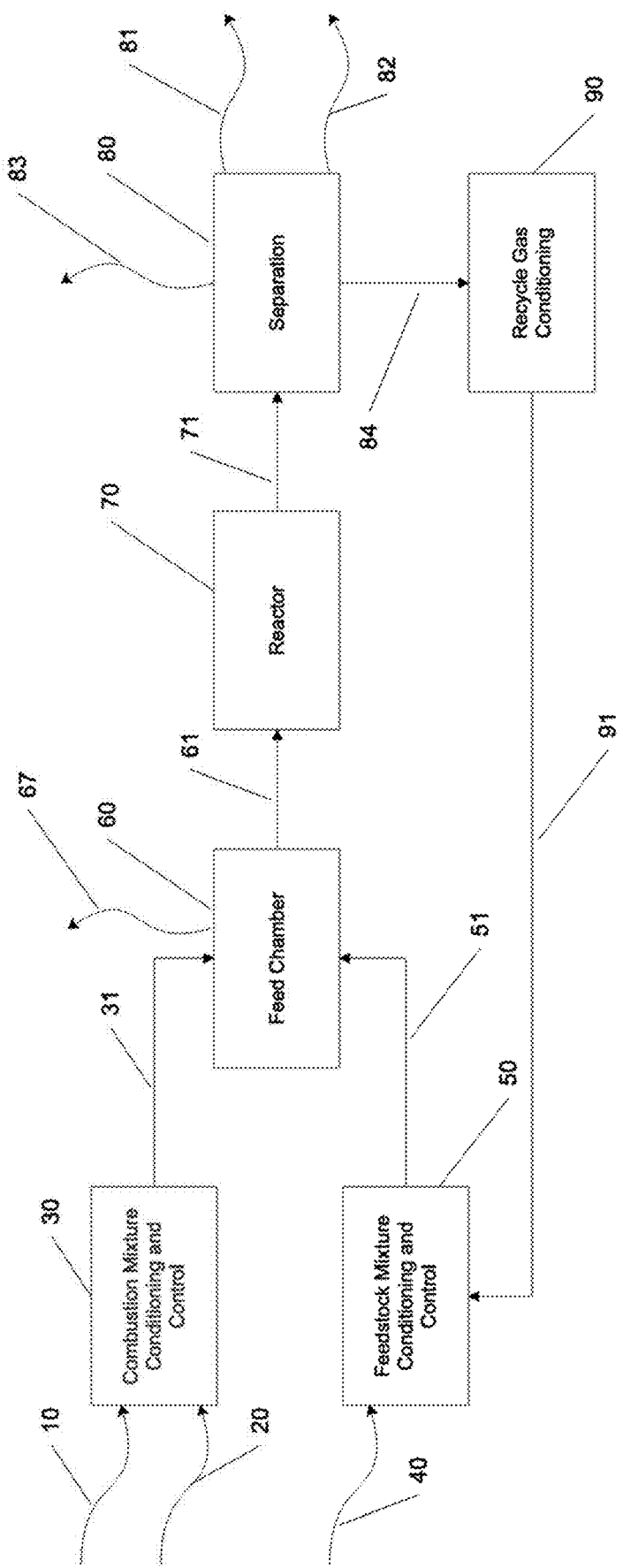
FIG. 8 is a schematic block diagram of a combustion chamber and a mixing chamber used to provide mixing of a feedstock gas with a combustible gas, and a third chamber to which the combustible and feedstock gas mixture is directed and in which one or more products are produced from the mixture, according to an embodiment of the disclosure.

With reference to FIG. 8, combustible gas 10 and oxidant gas 20 enter the combustion mixture conditioning and control system 30 which conditions the combustible gas mixture 31 to the correct temperature and pressure required by chamber 60. Feedstock gas 40 and recycle gas mixture 91 enter the feedstock mixture conditioning and control system 50 which conditions the feedstock mixture 51 to the correct temperature and pressure required by chamber 60. In some embodiments, a recycle gas mixture is not available and only the feedstock gas 40 enters the feedstock mixture conditioning and control system 50.

Chamber 60 is a constant volume device which uses the combustion energy from the conditioned combustible gas mixture 31 to increase the pressure and temperature of the conditioned feedstock mixture 51 to a reaction ready level. A combustion product gas mixture 67 comprising mainly of the combustion products of combusted conditioned combustible gas mixture 31 may be vented from chamber 60. The reaction ready gas mixture 61 enters the reactor 70, whereby it remains until the gas mixture is converted in a constant volume endothermic reaction to the reacted product mixture 71. The constant volume reaction is an unsteady process which operates in a batch mode and requires control of flow timing. This is accomplished by flow control in conditioning systems 30, 50, and separation and control system 80.

The reacted product mixture 71 enters the product separation and control system 80 which stops the reaction in reactor 70 by reducing the pressure and temperature of the desired reacted product mixture 71 and separates and/or purifies the individual product components 81, 82, the unwanted products 83 and the recycle gas mixture 84. The recycle gas mixture 84 enters the pre-conditioning recycle gas system 90 where the recycle gas mixture 84 is pre-conditioned to the desired temperature and pressure and flows to the feedstock mixture conditioning and control system 50.

In some embodiments, the combustible gas 10 and the feedstock gas 40 are natural gas, and the oxidant gas 20 is air. The desired reaction in reactor 70 is methane pyrolysis generally given by the following equation:

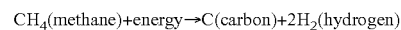

$$CH_4(\text{methane}) + \text{energy} \rightarrow C(\text{carbon}) + 2H_2(\text{hydrogen})$$

The individual product 81 is hydrogen gas, the individual product 82 is carbon, and the unwanted products 83 are primarily carbon dioxide, nitrogen and water. The recycle gas mixture 84 comprises primarily of unreacted natural gas, hydrogen, nitrogen and carbon monoxide.

Figure 9:
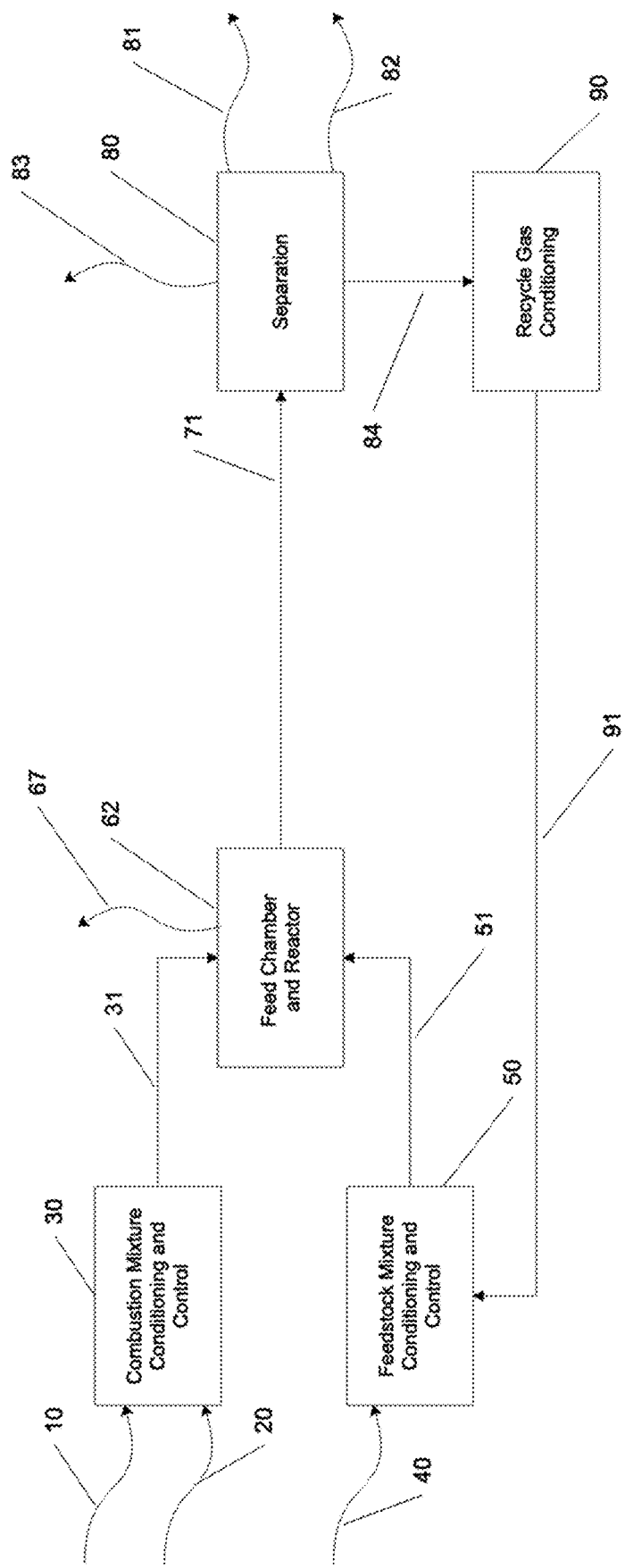
FIG. 9 is a schematic block diagram of a combustion chamber and a mixing chamber used to provide mixing of a feedstock gas with a combustible gas, and in which one or more products are produced from the mixture, according to an embodiment of the disclosure.

The system in FIG. 9 is similar to that of FIG. 8 with the exception that the chamber 60 and the reactor 70 are combined into the constant volume reactor 62.

Figure 10:
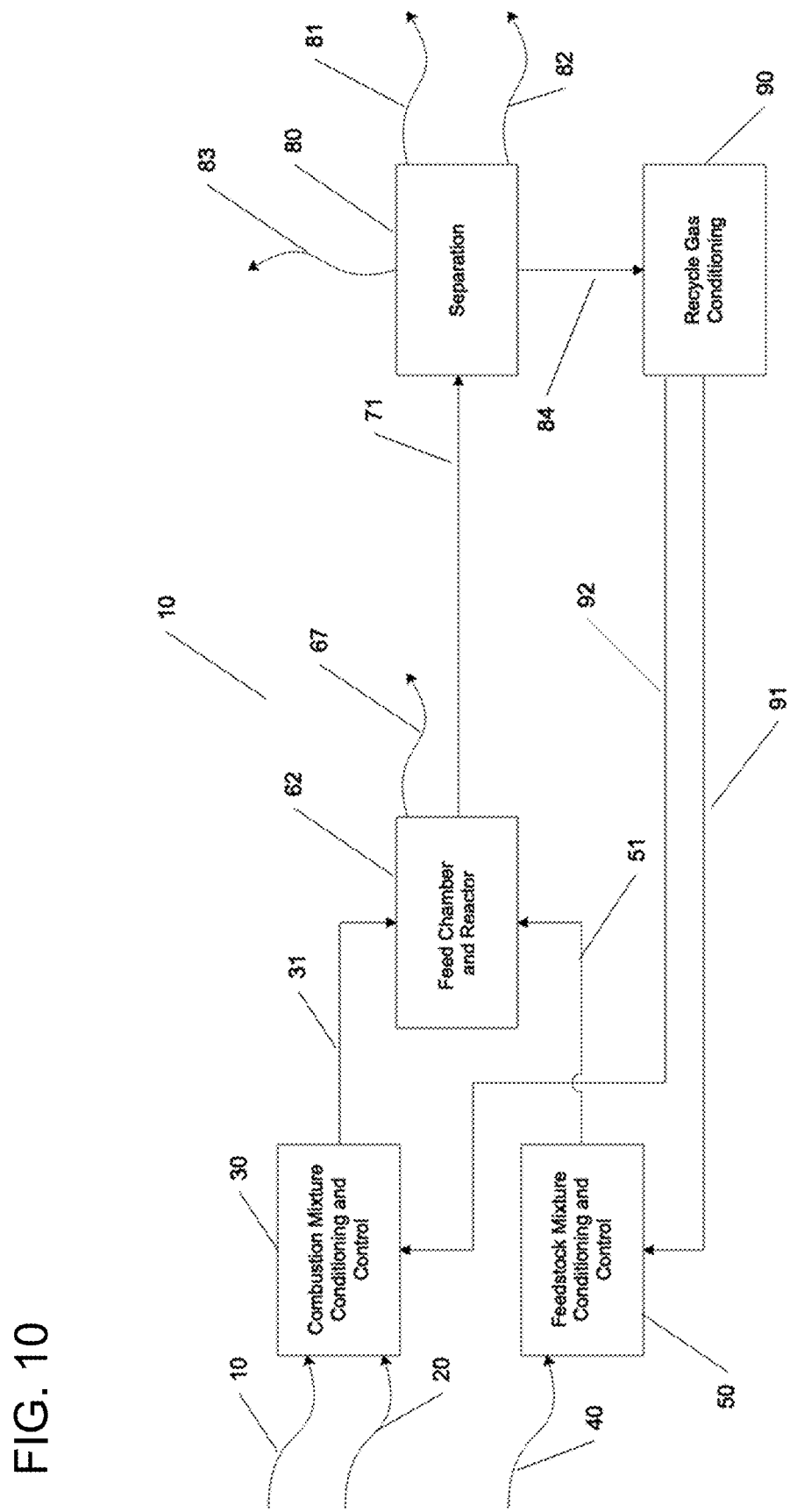
FIG. 10 is a schematic block diagram of a combustion chamber and a mixing chamber used to provide mixing of a feedstock gas with a combustible gas, and in which one or more products are produced from the mixture, and wherein recycled gases are used to provide thermal energy for the process, according to an embodiment of the disclosure.

FIG. 10 is similar to FIG. 9 but with a portion of recycle mixture 84, conditioned in pre-conditioned recycled gas conditioner 90, sent to the combustible gas conditioner and control system 30 to offset the amount of combustible gas 10 required.

Figure 11:
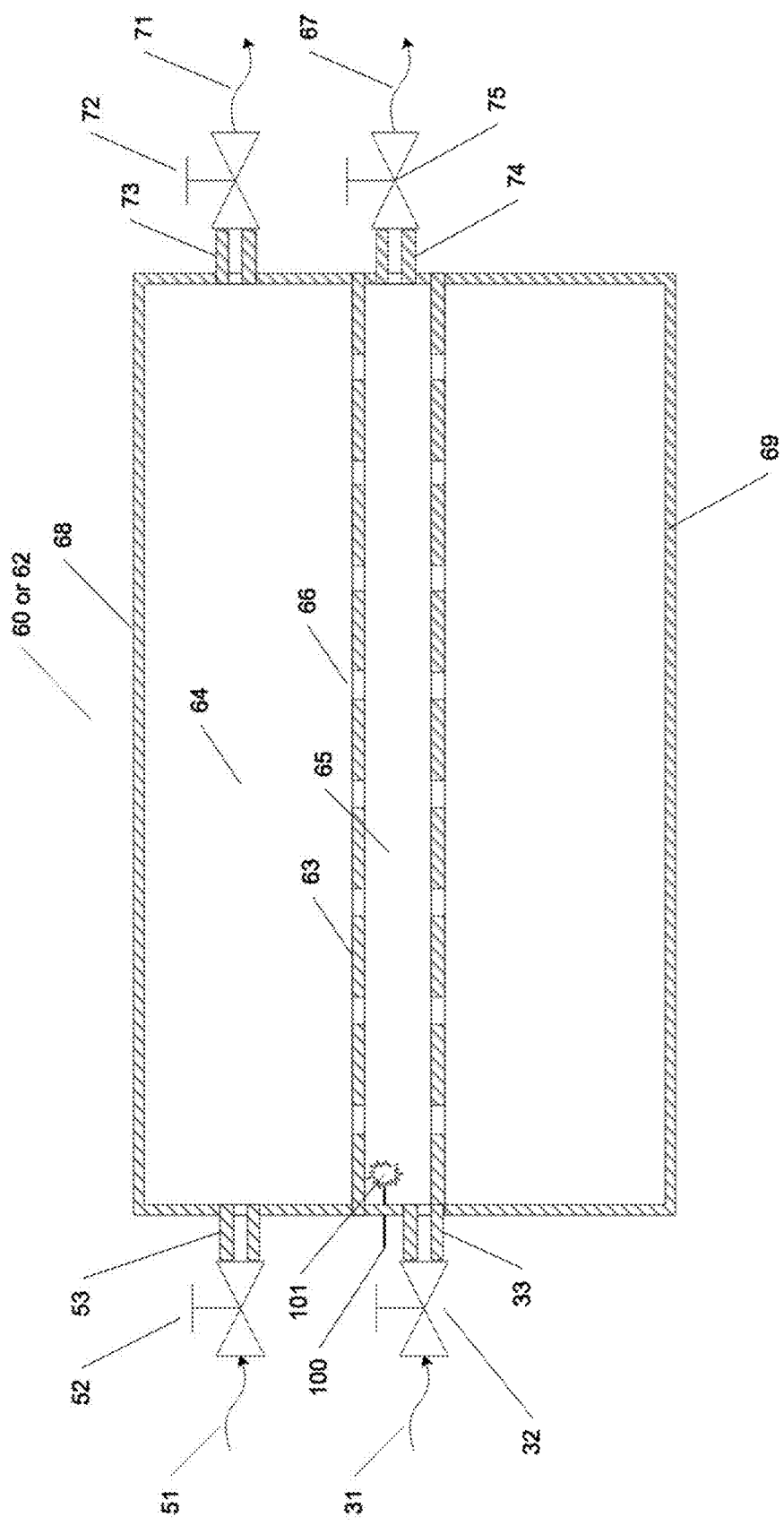
FIG. 11 is a schematic diagram of a combustion chamber located within a mixing chamber, according to an embodiment of the disclosure.

FIG. 11 represents a cross-sectional view of either chamber 60 or constant volume reactor 62. In this description, it represents constant volume reactor 62.

Constant volume reactor 62 comprises a combustion volume 65 contained within combustion chamber 63. Combustion chamber 63 is surrounded by reactor volume 64 which is contained in reactor chamber 68. Passageways 66 connect combustion volume 65 to reactor volume 64. Although combustion chamber 63 is shown in the center of reactor chamber 68, the combustion chamber 63 can be located anywhere in reactor chamber 68, including against the outside wall 69 of the reactor chamber 68.

Conditioned combustible gas mixture 31 enters combustion chamber 63 through combustible gas mixture valve 32 and passageway 33, displacing any combustion product gas mixture 67 present in combustion volume 65 out of reactor 62 via passageway 74 and combustion product valve 75. Conditioned feedstock gas mixture 51 enters mixing chamber 68 through feedstock gas mixture valve 52 and passageway 53, displacing desired reacted product mixture 71 in reactor volume 64 out of reactor 62 via passageway 73 and product valve 72. Both the conditioned combustible gas mixture 31 and the conditioned feedstock gas mixture 51 may simultaneously enter constant volume reactor 62 at the same pressure such that there is very little mixing via passageways 66.

Once predominantly all the combustible gas mixture 67 and desired product mixture 71 is displaced from reactor 62, combustion product valve 75 and product valve 72 are closed. Once the desired reactor pressure is reached, combustible gas mixture valve 32 and feedstock gas mixture valve 52 are closed, creating a closed volume in reactor 62. Igniter 100 creates ignition energy 101 which allows conditioned combustible gas mixture 31 in combustion chamber 63 to combust in an exothermic reaction creating combustion product gas mixture 67 at elevated temperature and pressure. Due to the resulting pressure difference between combustion chamber 63 and mixing chamber 68, a portion of combustible gas mixture 67 enters reactor volume 64, compressing feedstock gas mixture 51 to a higher pressure. Simultaneously, this portion of hot combustible gas mixture 67 mixes and heats feedstock gas mixture 51 by conduction, convection and radiation. Feedstock gas mixture 51 is now at an elevated temperature and pressure which creates the conditions for an endothermic reaction to occur. Constant volume reactor 62 is maintained as a closed volume until the endothermic reaction proceeds long enough to create desired product mixture 71. Once this condition is reached, product valve 72 and combustion product valve 75 are opened which drops the pressure and temperature, stopping the endothermic reaction. The process then repeats.

Figure 12:
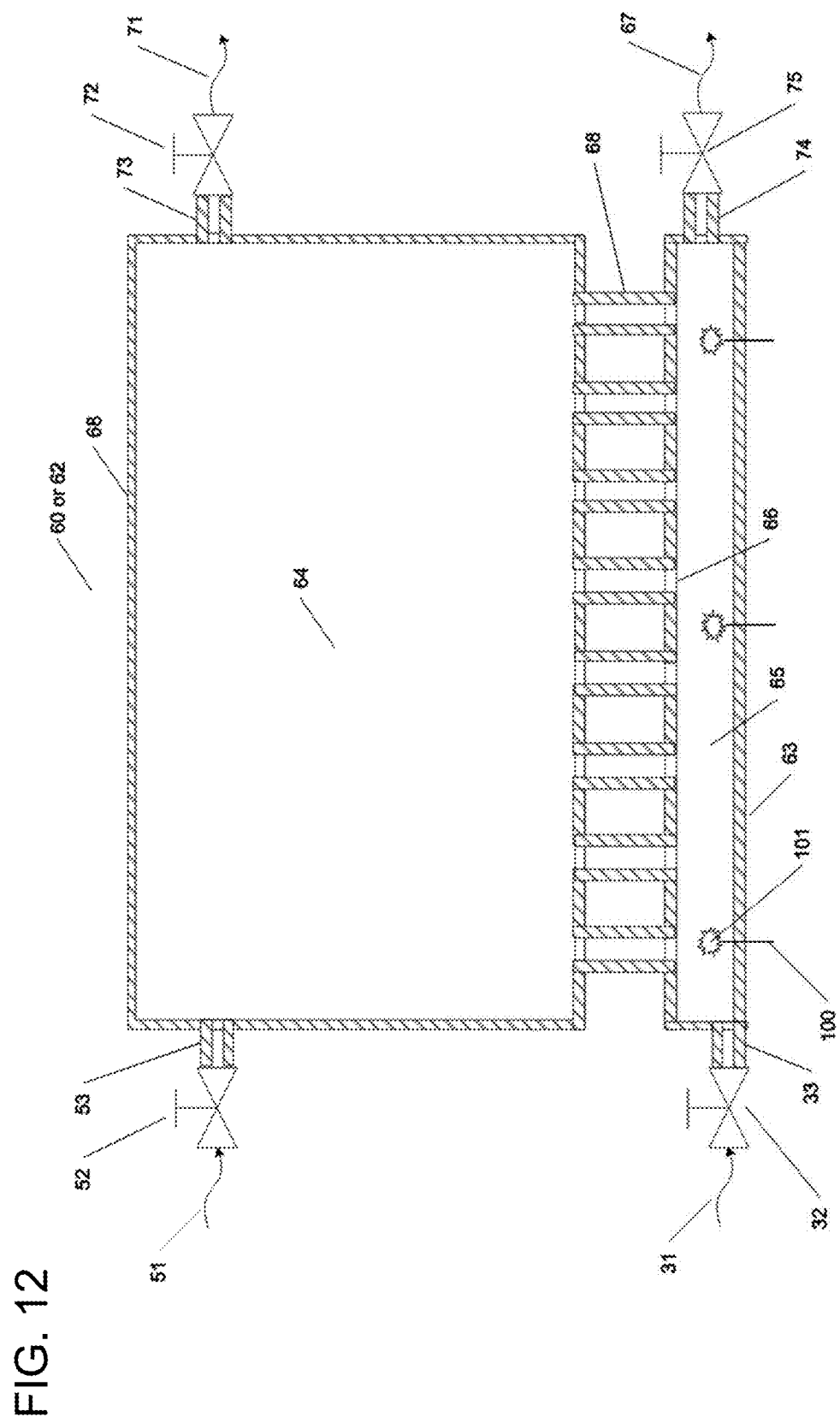
FIG. 12 is a schematic diagram of a combustion chamber located outside a mixing chamber, according to an embodiment of the disclosure.

FIG. 12 shows an embodiment of chamber 60 or constant volume reactor 62 with combustion chamber 63 external to mixing chamber 68. Combustion volume 65 is connected to reactor volume 64 via a number of passages 68. Multiple ignitors can be positioned along combustion chamber 63 to create specific combustion conditions if required. Multiple ignitors can also be positioned in the constant volume reactor 62 of FIG. 11 if the combustion chamber 63 is positioned next to reactor chamber wall 69.

FIG. 13 shows an isometric view of an embodiment of chamber 60 or constant volume reactor 62 with the combustion chamber 63 directly bonded with the reactor chamber wall 69 of reactor chamber 68. Directly bonding combustion chamber 63 to reactor chamber wall 69 provides structural support and alignment to combustion chamber 63, and essentially creates a one-piece chamber 60 or constant volume reactor 62.

In order to create a quasi or semi-continuous flow system, multiple chambers 60 or constant volume reactors 62 can be arranged together and operated out of phase such that each chamber or reactor is undergoing a different part of the process described in FIG. 11.

Figure 14:
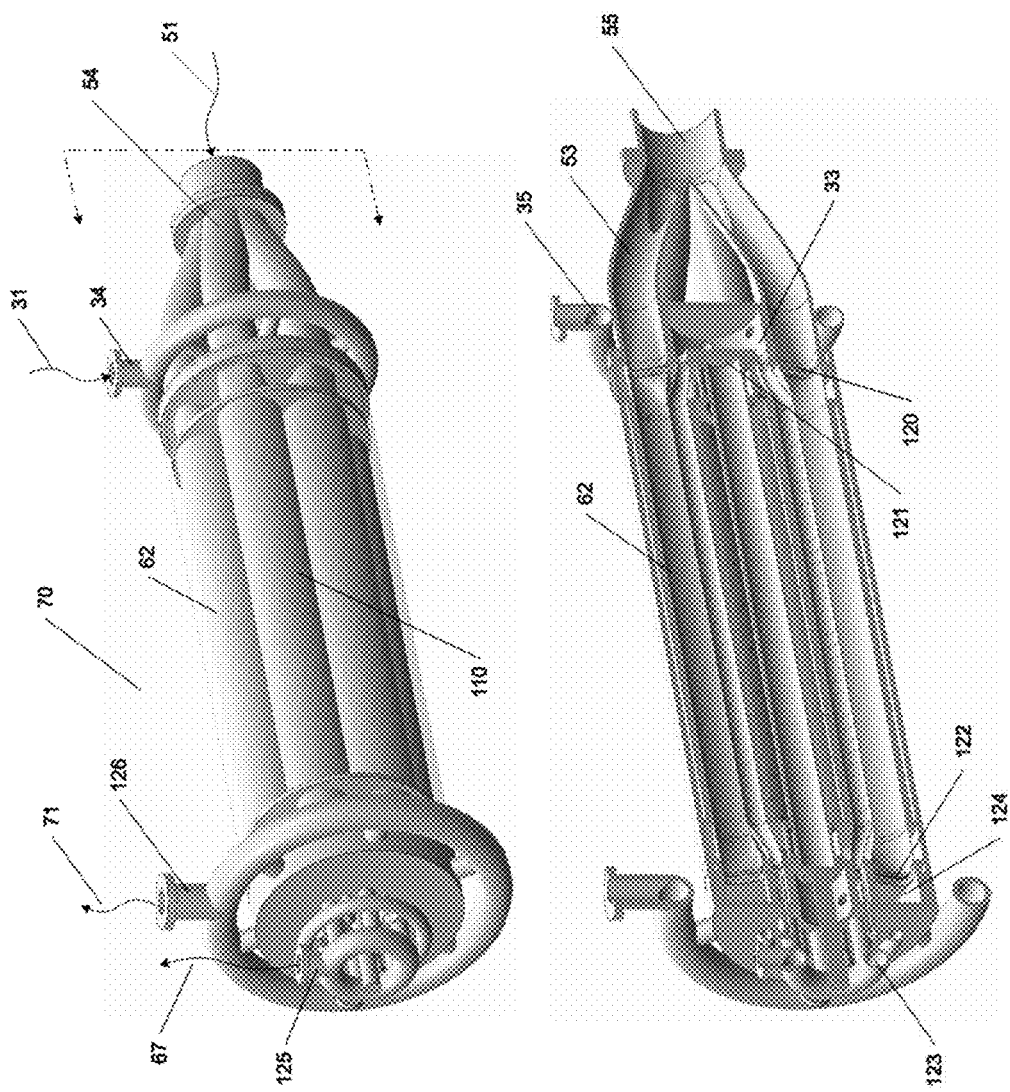
FIG. 14 shows a multi-reactor bundle with stationary reactors and rotating valves, according to an embodiment of the disclosure.

FIG. 14 shows an embodiment of a multi-tube reactor 110, with a multitude of individual constant volume reactors 62 shown in FIG. 14 arranged in a circular pattern. Conditioned combustible gas mixture 31 enters multitube reactor 110 via passageway 34 into plenum 35. Conditioned feedstock gas mixture 51 enters multitube reactor 110 via passageway 54 into plenum 55. Timing of conditioned combustion and conditioned feedstock gas mixtures entering multitube reactor 110 is controlled by inlet rotating valve 120 which is part of rotating valve assembly 121. Inlet rotating valve 120 performs the same function as combustible gas mixture valve 32, passageway 33, feedstock gas mixture valve 52, and passageway 53 described in FIG. 11. The timing of combustion product gas mixture 67 and desired product mixture 71 leaving multitube reactor 110 is controlled by outlet rotating valve 122 which is part of rotating valve assembly 121. Outlet rotating valve 122 performs the same function as combustion product valve 72, passageway 73, feedstock product valve 75, and passageway 74 described in FIG. 11.

Combustion product gas mixtures 67 from each constant volume reactor 62 is collected in combustion product plenum 123 and distributed out of the multitube reactor 110 via passageway 125. Product mixture 71 from each constant volume reactor 62, is collected in product plenum 124 and distributed out of the multitube reactor 110 via passageway, 126.

There will now be described embodiments of the disclosure in which a feedstock gas reactor, such as any of the feedstock gas reactors described above in connection with FIGS. 4A-14, may be used for producing hydrogen and nitrogen.

The PMP process for ammonia production may be based on an air-blown configuration of the PMP reactor. In the air-blown configuration (where air is fed to the reactor as the oxidant feedstock for combustion), oxygen from air is used to fuel the combustion reaction and residual nitrogen (~78% of air by volume, ~75% of air by weight) passes through the system as an inert gas. An $H_2$ separation step (using, for example, pressure-swing-adsorption (PSA)) selectively allows $N_2$ to pass through an $H_2$ separator, resulting in a product syngas composed of $H_2$ and $N_2$. Furthermore, one or more of the materials of the separator may be tailored to adjust a selectivity of the separator to hydrogen. This may enable further control of the resulting $H_2:N_2$ ratio in the product stream exiting the separator, by selectively allowing more or less hydrogen to be rejected to a recirculation gas stream. Furthermore, the proportion of $H_2$ to $N_2$ can be further tuned by varying one or more operating parameters of the PMP. A desired proportion of $H_2$ to $N_2$ may be, according to some embodiments, nominally 3:1 to feed the ammonia synthesis reaction:

$$3H_2+N_2 \rightarrow 2NH_3 (\text{ammonia}) \qquad (1)$$

Figure 1:
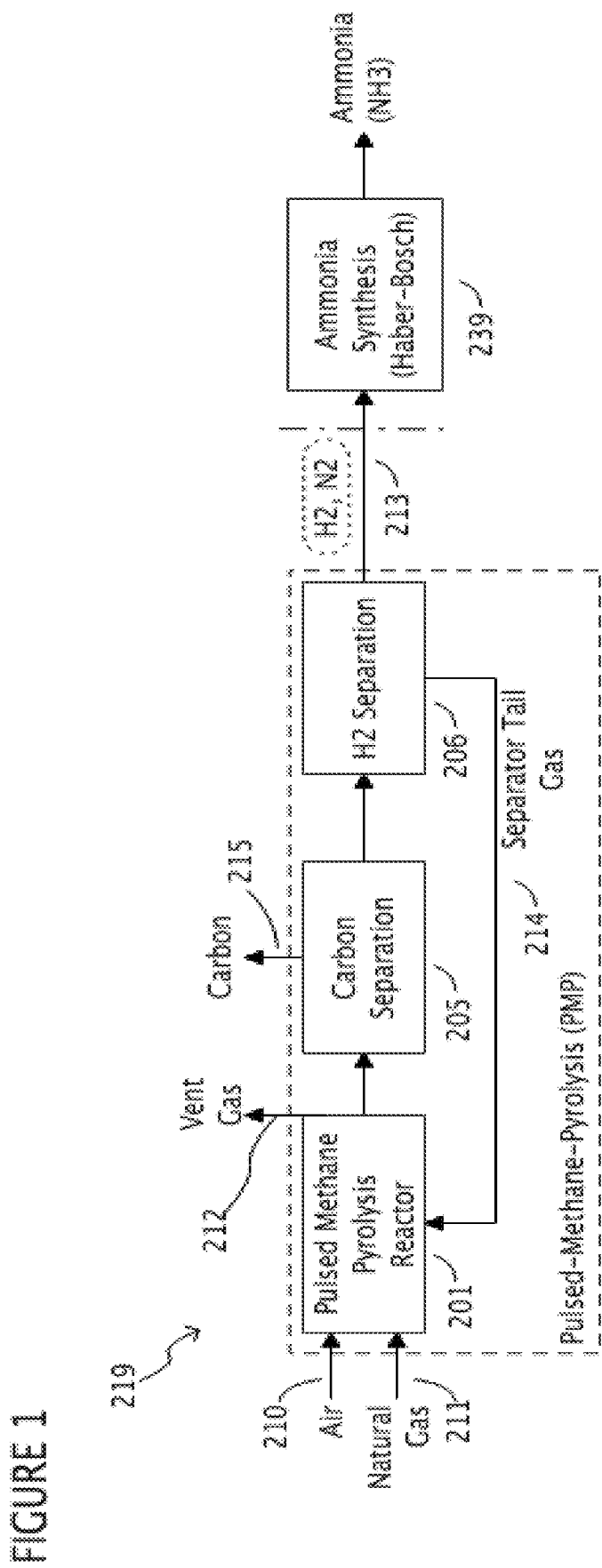
FIG. 1 shows a general embodiment of a pulsed methane pyrolysis process being used to produce ammonia synthesis feedstock, according to an embodiment of the disclosure.

Turning to FIG. 1, there is shown the overall PMP process for ammonia synthesis 219, according to an embodiment of the disclosure. As described above, the PMP reactor 201 comprises internal combustion and reaction sub-chambers.

The reaction chamber receives natural gas 211 as feedstock for hydrogen production, and the combustion chamber receives air 210 as an oxidant for the pulsed combustion reaction. The combustion reaction is initially seeded with the natural gas feedstock 211 as fuel. Once the PMP reaction takes place, the mixed product stream 228 extracted from the reactor 201 is stripped of carbon 215 in a carbon separator 205. The resulting gas stream is then desiccated of the product water created in the combustion reaction (not shown) and passed to a PSA hydrogen separator 206. The output of the hydrogen separator 206 is a mixed syngas stream 213 of hydrogen and nitrogen at a desired proportion for ammonia synthesis (nominally 3:1 $H_2:N_2$). This mixed syngas stream 213 is sent to a reactor of a Haber Bosch process 239 at which the mixed syngas stream 213 is reacted at a high pressure and a high temperature over a catalyst to form ammonia.

When the system is operational, a recycled tail gas 214 extracted from the hydrogen separator 206 is used as fuel and recirculated to the pyrolysis reactor 201. Residual tail gas 214 contain a mixture of unreacted hydrocarbons, un-separated hydrogen, carbon monoxide, and carbon dioxide.

Inside the reactor 201, the combustion process produces high-temperature and high-pressure combustion products that dynamically mix with the feedstock gas 211 in the reaction chamber. The resulting high-temperature feedstock gas 211 is dissociated according to the reaction:

$$CH_4 \rightarrow 2H_2 + C_{(s)} \quad (2)$$

Introducing a stoichiometric quantity of oxidant (oxygen from air) to the combustion chamber may yield a mixed, two-phase product stream of carbon and hydrogen containing syngas with a $H_2:N_2$ ratio of less than the target ratio of 3:1 (e.g., ~1.6:1). To increase the ratio such that the syngas has a $H_2:N_2$ ratio of approximately 3:1 suitable for ammonia synthesis, several operating conditions can be adjusted such as the input temperatures and pressures of the oxidant 210 and the feedstock gas 211, as well as the oxidant stoichiometry in the combustion chamber of the reactor 201. In addition, a fraction of the reaction products can be periodically vented 212 from the reactor 201, thereby lowering the quantity of inert gases that accumulate in the syngas. Tuning this combination of factors may enable the PMP process to yield a product stream with an $H_2$ to $N_2$ ratio appropriate for ammonia synthesis.

Figure 2:
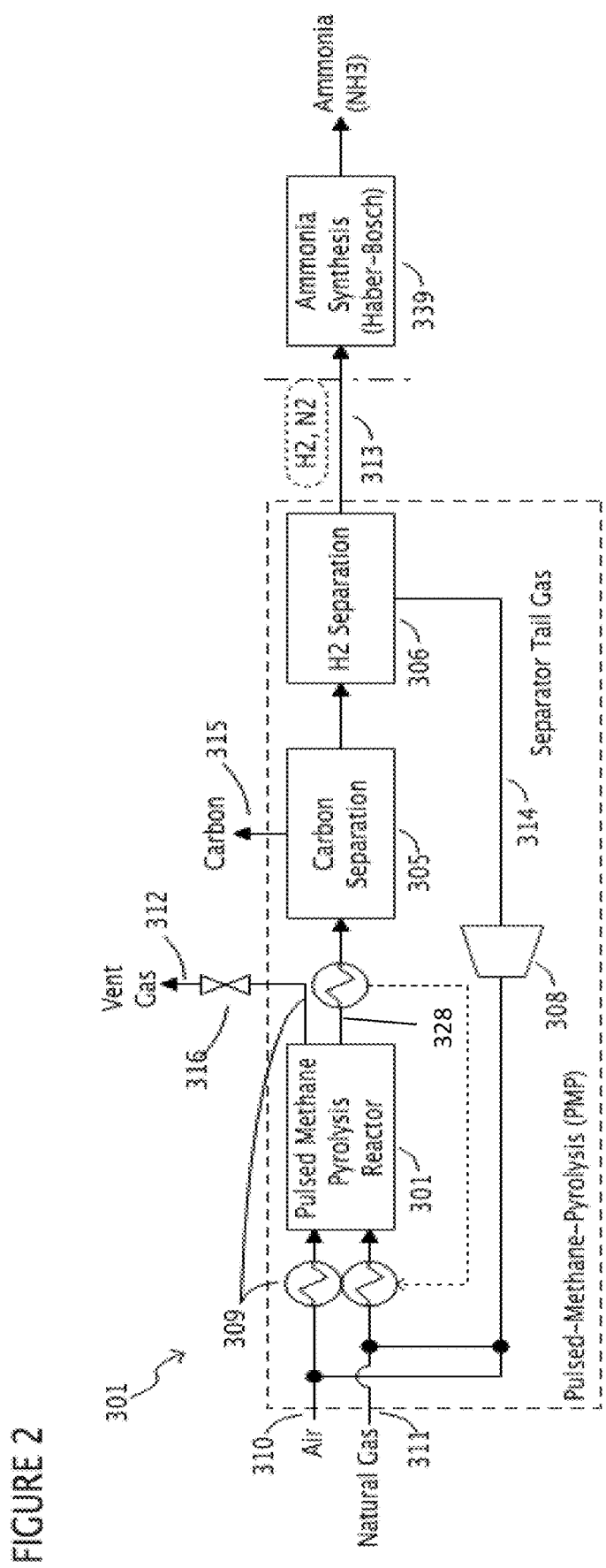
FIG. 2 shows a pulsed methane pyrolysis process with process controls for ammonia synthesis, according to an embodiment of the disclosure.
Figure 3:
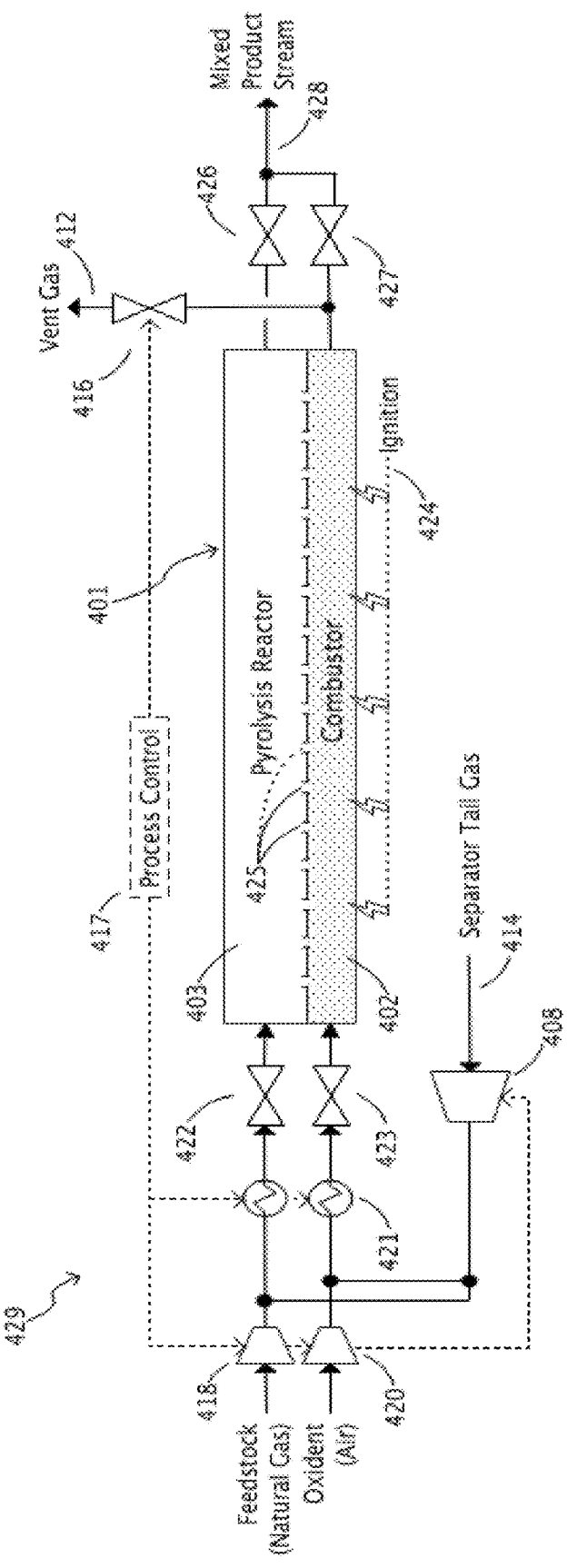
FIG. 3 shows an individual pulsed methane pyrolysis reactor and process control elements for yielding ammonia synthesis feed syngas, according to an embodiment of the disclosure.

With reference to FIG. 2 and FIG. 3, the process for tuning the product syngas composition to the desired $H_2$ to $N_2$ ratio is further illustrated. The architecture of the system shown in FIG. 2 is similar to that shown in FIG. 1, and therefore like components are labelled using like reference numbers. In FIG. 2, oxidant (air) 310 is combined with tail gas 314 extracted from the hydrogen separator 306 which may be an industry-standard pressure swing adsorption (PSA) unit. The tail gas 314 contains un-separated hydrogen, unreacted methane feedstock (natural gas), as well as the heavy carbon oxide products of combustion, such as carbon monoxide (CO) and carbon dioxide ($CO_2$). Because the hydrogen separator 306 does not filter small molecules such as nitrogen, a large fraction of nitrogen passes through hydrogen separator 306 with the filtered hydrogen, and an un-separated fraction is recirculated to reactor 311 with the separator tail gas 314. The tail gas 314 is re-pressurized by a recirculation compressor 308 and mixed with incoming reactant streams 310 and 311 to repeat the PMP reaction cycle.

Once the fresh incoming oxidant (air) 310 is mixed with the tail gas 314 to form the combustible gas mixture that is inputted to the combustion chamber of reactor 301, the combustible gas mixture is preheated by a heat exchanger 309 using waste heat from the reaction products formed as a result of the PMP reaction. Because the reactor 301 (and internal combustion and reaction chamber) comprise fixed volumes, the degree of preheating fixes (at set inlet pressures) the densities of the combustible gas mixture and the feedstock gas mixture at respective inlets of the reactor 301, and hence fixes the total quantity of nitrogen contained in the combustible gas mixture. The temperature and pressure of the combustible gas mixture therefore determine both the quantity of combustion heat that is generated in the reactor 301 to provide the energy required for the pyrolysis of the natural gas feedstock 311, as well as the quantity of non-reactive nitrogen that will move through the reactor 301 and be present in the product stream 328.

Once the pyrolysis reaction takes place in the reactor 301, a fraction of the combustion products is mixed with the products in the reaction chamber, while the remainder of the combustion products reside in the combustion chamber. The residual combustion products comprise of water, $CO_2$, CO, and nitrogen. Before all the products in the reaction chamber and combustion chamber are combined at an outlet of the reactor 301, a vent valve 316 can be operated to expel a fraction of the nitrogen-containing combustion product gas 312. The quantity of vented gas can be adjusted to adjust the quantity of inert gases that circulate in the system, including nitrogen, and therefore enable the quantity of nitrogen present in the post-separation product syngas 313 to be tailored.

Once the PMP reaction takes place, the mixed product stream 328 extracted from the reactor 301 is stripped of carbon 315 in a carbon separator 305. The resulting gas stream is then desiccated of the product water created in the combustion reaction (not shown) and passed to a PSA hydrogen separator 306. The output of the hydrogen separator 306 is a mixed syngas stream 313 of hydrogen and nitrogen at a desired proportion for ammonia synthesis (nominally 3:1 $H_2:N_2$). This mixed syngas stream 313 is sent to a reactor of a Haber Bosch process 339 at which the mixed syngas stream 313 is reacted at a high pressure and a high temperature over a catalyst to form ammonia.

A more detailed description of the process control is now made with reference to FIG. 3 which summarizes some of the tuning parameters that may be controlled to achieve a syngas product suitable for ammonia synthesis. The architecture of the system shown in FIG. 3 is similar to those shown in FIGS. 1 and 2, and therefore like components are labelled using like reference numbers.

The overall PMP reactor 401 is comprised of a constant-volume combustion chamber 402 and a constant-volume pyrolysis reaction chamber 403. The two chambers are in communication through a series of jet orifices 425 positioned between them. When combustion and reactant gases are loaded into the chambers 402 and 403 at equal pressures, no gas is transferred from one chamber to the other. When the combustible gas in the combustion chamber 402 is ignited by an ignition means 424, the combustible gas is rapidly oxidized and the temperature and pressure in the combustion chamber 402 rise dramatically. For example, with a reactant feed pressure of 13.5 bar and combustion and feedstock gas inlet temperatures of 600 K and 1000 K respectively, after combustion, the combustion chamber 402 may achieve temperatures and pressures of 3,300 K and 75 bar. At this point, the pressure between the two chambers 402 and 403 is equalized as hot combustion product gas expands through the orifices 425 until the chambers 402 and 403 reach pressure equilibrium. As a result of this transfer and mixing of gases, the feedstock gas is heated and pressurized to over 20 bar and at least 1,350 K, at which point the feedstock gas quickly begins to decompose by thermal pyrolysis. At this point, the reaction chamber 403 contains decomposed natural gas products comprising of hydrogen and solid carbon as well as residual combustion products, inert gases such as nitrogen, and unreacted feedstock. The combustion chamber 402 contains only combustion product gases and unreacted gases.

The pyrolysis reaction is quenched when the reactor outlet valve 426 is opened and the reaction chamber 403 is de-pressurized. At the same time, the combustion chamber 402 can be depressurized by opening the combustion chamber outlet valve 427. As the combustion product gas is depressurized, a vent valve 416 can be operated to divert a fraction of combustion products 412 from the combustion product stream and vent the fraction out of the system 429. The degree of venting can be adjusted by controlling the frequency and/or duration of the operation of vent valve 416, as well as by selecting an appropriate pressure drop across the overall vent flow stream. According to some embodiments, a size of one or more orifices of the vent valve 416 may be adjusted so as to control the venting. Control of the venting can vary the amount of residual combustion product gas that is vented as a fraction of the overall residual combustion gas in the combustion chamber (from 0% to 100%). This vent mechanism enables the final ratio of hydrogen to nitrogen in the product syngas to be adjusted. An ideal ratio of 3:1 $H_2:N_2$ may be achieved through frequent and substantial venting to reduce nitrogen levels. For example, the vent valve 416 could be opened every reaction cycle to expel up to 80% of the residual combustion product gas.

The quenched pyrolysis reaction and un-vented combustion products are then combined to form a mixed product stream 428. All but a majority of the product hydrogen and nitrogen are ultimately recycled to the reactor 401 so the only net emissions from the system are from the vent gas. In the example of an 80% combustion chamber gas vent every reaction cycle, this vent emission equates to approximately 0.27 $kgCO_2/kgH_2$ which represents an over 95% reduction in greenhouse gas emissions as compared to hydrogen production from even the lowest prior art greenhouse gas emitting natural gas reforming systems.

To deliver the reactants to the reactor 401 at the desired temperatures and at the same pressure, the feedstock (natural gas) and oxidant (air) are each pressurized with feedstock and oxidant compressors 418 and 420 that are controlled to introduce the desired proportion of reactants to the recirculated tail gas 414 which is itself re-pressurized by a recirculation compressor 408. Adjusting each of the recirculation compressor 408, feedstock compressor 418, and oxidant compressor 420 ensures that both the feedstock and combustible gas enter the reactor 401 at the same pressure, and that the combustible gas is mixed at the desired stoichiometric ratio of oxidant to fuel (comprised in the tail gas 414) to achieve the desired combustion reaction temperature and to further control the quantity of nitrogen gas in the system. Each stream then passes through a pre-heat heat exchanger 421 to set the temperature of each inlet stream. The final temperature and pressure of the combustible gas mixture set the total quantity of nitrogen that will enter the constant volume reactor 401.

Once the feedstock and oxidant gases are mixed with tail gas 414, pressurized, and pre-heated, they are introduced into the reactor 401 by means of a feedstock inlet valve 422 and a combustible gas inlet valve 423. The timing of loading, reacting, and quenching the reactor 401 is controlled by the sequencing of inlet and outlet valves. According to some embodiments, inlet valves 422 and 423, outlet valves 426 and 427, and the vent valve 416 are coordinated by means of a fixed connection such as rotating valves connected to a common drive shaft or poppet valves sequenced by a cam shaft.

According to some embodiments, the overall process control function 417 ensures that the oxidant stoichiometry, the delivery temperatures and pressures of the reactants, and the vent control are each adjusted to result in a product syngas suitable for ammonia synthesis. The control mechanism may be a combination of dynamic control and passive control based on specific component performance specifications.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A method of producing hydrogen and nitrogen using a feedstock gas reactor comprising a reaction chamber fluidly connected to a combustion chamber via one or more fluid flow paths, the method comprising:
  introducing a feedstock gas comprising a hydrocarbon into the reaction chamber;
  introducing a combustible gas mixture into the combustion chamber, wherein the combustible gas mixture comprises air and one or more combustible gases;
  combusting the combustible gas mixture in the combustion chamber so as to form one or more combustion product gases comprising nitrogen and so as to cause at least a portion of the one or more combustion product gases to flow into the reaction chamber via the one or more fluid flow paths and mix with the feedstock gas, wherein, as a result of the mixing of the at least a portion of the one or more combustion product gases with the feedstock gas, energy is transferred from the at least a portion of the one or more combustion product gases to the feedstock gas and thereby causes a chemical reaction to decompose the feedstock gas into one or more reaction product gases comprising hydrogen;

extracting a mixed product stream from the feedstock gas reactor, wherein the mixed product stream comprises hydrogen from the one or more reaction product gases and nitrogen from the one or more combustion product gases;

collecting, from the mixed product stream, a ratio of hydrogen to nitrogen; and controlling the ratio of collected hydrogen to collected nitrogen by adjusting one or more parameters of the method.

2. The method of claim 1, wherein the ratio of collected hydrogen to collected nitrogen is between about 1:1 and about 5:1.

3. The method of claim 1, wherein the ratio of collected hydrogen to collected nitrogen is about 3:1.

4. The method of claim 1, wherein the one or more parameters comprise one or more of:
a pressure of the feedstock gas at an inlet of the reaction chamber;
a temperature of the feedstock gas at the inlet of the reaction chamber;
a pressure of the combustible gas mixture at an inlet of the combustion chamber;
a temperature of the combustible gas mixture at the inlet of the combustion chamber;
a stoichiometry of the air in the combustible gas mixture;
a quantity of gas vented from the combustion chamber; and
a degree of hydrogen separation of a hydrogen separator through which the mixed product stream is passed.

5. The method of claim 1, wherein extracting the mixed product stream comprises extracting from the reaction chamber a reaction product gas stream comprising at least a portion of the one or more reaction product gases.

6. The method of claim 1, wherein extracting the mixed product stream comprises extracting from the combustion chamber a combustion product gas stream comprising at least a portion of the one or more combustion product gases.

7. The method of claim 6, further comprising venting at least a portion of the combustion product gas stream.

8. The method of claim 7, wherein adjusting the one or more parameters comprises adjusting a vent gas quantity of the combustion product gas stream, wherein the vent gas quantity is indicative of a relative quantity of the combustion product gas stream that is vented.

9. The method of claim 8, wherein adjusting the vent gas quantity comprises adjusting one or more of:
a duration of the venting of the at least a portion of the combustion product gas stream;
a frequency of the venting of the at least a portion of the combustion product gas stream;
a size of one or more vent orifices used for the venting of the at least a portion of the combustion product gas stream;
a number of vents used for the venting of the at least a portion of the combustion product gas stream; and
a pressure drop across a vent flow path used for the venting of the at least a portion of the combustion product gas stream.

10. The method of claim 8, wherein the vent gas quantity is from about 10% to about 100% of a quantity of the one or more combustion product gases formed in the combustion chamber.

11. The method of claim 10, wherein the vent gas quantity is about 80% of the quantity of the one or more combustion product gases formed in the combustion chamber.

12. The method of claim 8, wherein adjusting the vent gas quantity is based on a measured or inferred process parameter of the method.

13. The method of claim 12, wherein the measured or inferred process parameter comprises one or more of:
a concentration of $H_2$ in the mixed product stream;
a flow rate of the feedstock gas; and
a ratio of $H_2$ to $N_2$ in the mixed product stream.

14. The method of claim 7, wherein the steps of introducing the feedstock gas, introducing the combustible gas mixture, and combusting the combustible gas mixture are repeated multiple times as part of multiple corresponding reaction cycles, and wherein the step of venting the at least a portion of the combustion product gas stream is performed every reaction cycle or every preset number of reaction cycles.

15. The method of claim 1, wherein adjusting the one or more parameters of the method comprises controlling a stoichiometry of the air in the combustible gas mixture to within a range of about 0.6 to about 1.4.

16. The method of claim 15, wherein controlling the stoichiometry of the air in the combustible gas mixture comprises controlling the stoichiometry of the air in the combustible gas mixture to about 1.2.

17. The method of claim 15, wherein controlling the stoichiometry of the air in the combustible gas mixture comprises adjusting one or more of: a pressure of the one or more combustible gases at an inlet of the combustion chamber; and a pressure of the air at an inlet of the combustion chamber.

18. The method of claim 1, wherein adjusting the one or more parameters of the method comprises controlling a pressure or a temperature of the combustible gas mixture at an inlet of the combustion chamber by controlling one or more of: a compressor for recirculating a tail gas extracted from the feedstock reactor; and an air feed compressor for delivering an oxidant to the feedstock reactor.

19. The method of claim 1, wherein adjusting the one or more parameters of the method comprises controlling a pressure or a temperature of the feedstock gas at an inlet of the reaction chamber by controlling an output of one or more of: a compressor for recirculating a tail gas extracted from the feedstock reactor; and an air feed compressor for delivering the feedstock gas to the feedstock reactor.

20. The method of claim 1, wherein collecting, from the mixed product stream, the ratio of hydrogen to nitrogen comprises separating at least some hydrogen from the mixed product stream.

21. The method of claim 20, wherein separating the at least some hydrogen comprises using one or more of: a membrane separator; chemical adsorption; pressure swing adsorption; and temperature swing adsorption.

22. The method of claim 21, wherein the membrane separator is a polymeric membrane separator or a palladium membrane separator.

23. The method of claim 20, further comprising recirculating to the feedstock reactor hydrogen that is not separated from the mixed product stream.

24. The method of claim 1, wherein the combustible gas mixture is introduced into the combustion chamber at a pressure that is equal to a pressure with which the feedstock gas is introduced into the reaction chamber.

25. The method of claim 1, wherein introducing the combustible gas mixture into the combustion chamber comprises controlling a quantity of the combustible gas mixture that is introduced into the combustion chamber by controlling one or more of a pressure and a temperature of the combustible gas mixture.

26. The method of claim 1, further comprising, during the introduction of the combustible gas mixture into the combustion chamber, controlling a temperature of the combustible gas mixture to between about 300 K and about 600 K.

27. The method of claim 1, further comprising, during the introduction of the feedstock gas into the reaction chamber, controlling a temperature of the feedstock gas to between about 1,000 K and about 1,300 K.

28. The method of claim 1, further comprising, during the introduction of the combustible gas mixture into the combustion chamber, controlling a pressure of the combustible gas mixture to between about 1 bar and about 20 bar.

29. The method of claim 28, wherein controlling the pressure of the combustible gas mixture comprises controlling the pressure of the combustible gas mixture to between about 12 bar and about 14 bar.

30. The method of claim 1, wherein the feedstock gas comprises a mixture of natural gas and recycled gas comprising one or more gases extracted from the mixed product stream.

31. The method of claim 30, wherein the recycled gas comprises one or more of: recycled unreacted feedstock gas; hydrogen; carbon monoxide; carbon dioxide; and nitrogen.

* * * * *